(12) United States Patent
Currie et al.

(10) Patent No.: US 11,623,850 B2
(45) Date of Patent: Apr. 11, 2023

(54) RETENTION MECHANISM FOR AGRICULTURAL MACHINERY

(71) Applicant: Hustler Equipment Limited, Hastings (NZ)

(72) Inventors: James Robert Currie, Hastings (NZ); Richard Andrew Currie, Hastings (NZ)

(73) Assignee: HUSTLER EQUIPMENT LIMITED, Hastings (NZ)

( * ) Notice: Subject to any disclaimer, the term of this patent is extended or adjusted under 35 U.S.C. 154(b) by 0 days.

(21) Appl. No.: 17/412,584

(22) Filed: Aug. 26, 2021

(65) Prior Publication Data
US 2021/0403301 A1    Dec. 30, 2021

Related U.S. Application Data

(63) Continuation of application No. 16/062,866, filed as application No. PCT/NZ2016/050198 on Dec. 16, 2016, now Pat. No. 11,130,661.

(30) Foreign Application Priority Data

Dec. 18, 2015  (NZ) ........................ 715347

(51) Int. Cl.
*B66F 9/18*        (2006.01)
*B66F 9/00*        (2006.01)
(Continued)

(52) U.S. Cl.
CPC ............... *B66F 9/18* (2013.01); *A01B 73/00* (2013.01); *A01D 87/12* (2013.01); *A01D 87/122* (2013.01);
(Continued)

(58) Field of Classification Search
CPC ..... B66F 9/00; B66F 9/12; B66F 9/18; A01D 87/12; A01D 87/122; A01D 87/127; A01D 2087/128
See application file for complete search history.

(56) References Cited

U.S. PATENT DOCUMENTS 4,078,733 A    3/1978  Popiolek
4,266,899 A    5/1981  Skeem
(Continued)

FOREIGN PATENT DOCUMENTS

AU    581430 B2    2/1989
DE    2 556 234 A1   6/1977
(Continued)

OTHER PUBLICATIONS

International Search Report and Written Opinion for International Application No. PCT/NZ2016/050198 dated Mar. 28, 2017.
(Continued)

*Primary Examiner* — Saul Rodriguez
*Assistant Examiner* — Ashley K Romano
(74) *Attorney, Agent, or Firm* — Merchant & Gould P.C.

(57) ABSTRACT

A retention mechanism for retaining an agricultural machine in engagement with a fork assembly. The mechanism may be provided on the fork assembly, agricultural machine or split between them. The retention mechanism may be actuated by a foot associated with either the fork assembly or the agricultural machine. The retention mechanism may employ pivoting latches or a clamping mechanism that clamps upon the forks or tines.

9 Claims, 8 Drawing Sheets

(51) Int. Cl.
*B66F 9/12* (2006.01)
*A01B 73/00* (2006.01)
*A01D 87/12* (2006.01)

(52) U.S. Cl.
CPC .............. *A01D 87/127* (2013.01); *B66F 9/00* (2013.01); *B66F 9/12* (2013.01); *A01D 2087/128* (2013.01)

(56) References Cited

U.S. PATENT DOCUMENTS

| | | | |
|---|---|---|---|
| 4,443,146 A | 4/1984 | Duncan | |
| 4,538,953 A | 9/1985 | Abramson, Jr. | |
| 6,715,980 B2* | 4/2004 | Bouthillier | B65G 67/30 |
| | | | 414/420 |
| 6,767,175 B2 | 7/2004 | Fujita et al. | |
| 7,967,545 B2 | 6/2011 | Lauvdal | |
| 9,751,739 B2* | 9/2017 | Karlsson | B66C 1/101 |
| 9,976,280 B2* | 5/2018 | Honermann | E02F 3/962 |
| 10,501,297 B2* | 12/2019 | Wright | B66F 9/144 |
| 10,556,783 B2* | 2/2020 | Ivey | B66F 9/19 |
| 11,096,330 B2* | 8/2021 | Currie | A01D 87/122 |
| 2003/0156934 A1 | 8/2003 | Fujita et al. | |
| 2005/0035232 A1 | 2/2005 | Lepage et al. | |
| 2010/0111647 A1 | 5/2010 | Noonan et al. | |
| 2010/0308340 A1 | 12/2010 | Tilak et al. | |
| 2012/0099957 A1 | 4/2012 | Burnett et al. | |

FOREIGN PATENT DOCUMENTS

| | | |
|---|---|---|
| DE | 20 2004 004 342 U1 | 6/2004 |
| FR | 2 511 963 A1 | 3/1983 |
| GB | 639056 A | 6/1960 |
| GB | 1137875 A | 12/1968 |
| GB | 1345521 A | 1/1974 |
| GB | 2483988 A | 3/2012 |
| JP | H8-333097 A | 12/1996 |
| JP | 2000-26090 A | 1/2000 |
| JP | 2001-316095 A | 11/2001 |
| JP | 2003-261300 A | 9/2003 |
| JP | 2006-240837 A | 9/2006 |
| NZ | 196268 A | 5/1986 |
| WO | 2010/120185 A1 | 10/2010 |

OTHER PUBLICATIONS

International Preliminary Report on Patentability for International Application No. PCT/NZ2016/050198 dated Jun. 19, 2018.

* cited by examiner

RETENTION MECHANISM FOR AGRICULTURAL MACHINERY

CROSS-REFERENCE TO RELATED APPLICATIONS PAPERS

This application is a Continuation of U.S. application Ser. No. 16/062,866 filed 15 Jun. 2018, which is a National Stage Application of PCT/NZ2016/050198, filed 16 Dec. 2016, which claims benefit of Serial No. 715347, filed 18 Dec. 2015 in New Zealand and which applications are incorporated herein by reference. To the extent appropriate, a claim of priority is made to each of the above disclosed applications.

FIELD

This invention relates to a retention mechanism for maintaining a fork assembly engaged with an agricultural machine when it is elevated above the ground.

BACKGROUND

It is common for a range of agricultural machines to be transported by engaging the forks or tines of a tractor fork assembly into one or more sleeves of an agricultural machine. There is a danger when the forks or tines are downwardly inclined, or during changes in vehicle velocity, that the machine may slide off the forks or tines.

Manual methods of securing machines to fork assemblies are known but may be inconvenient and require operator diligence to operate them.

It is an object of the invention to provide an automatic mechanism for securing a machine to a fork assembly or at least a more convenient mechanism or to at least provide the public with a useful choice.

SUMMARY

According to one example embodiment there is provided an agricultural machine assembly including:
a. a fork assembly having one or more forks or tines;
b. an agricultural machine arranged to engage via the one or more forks or tines; and
c. a retention mechanism including a foot extending below the bottom of the assembly and arranged so that lifting the foot above the ground activates the retention mechanism to retain the one or more forks or tines and lowering the assembly on the foot when grounded releases the retention mechanism.

According to another example embodiment there is provided an agricultural machine arranged to engage with one or more forks or tines of a fork assembly including a retention activation mechanism including a foot slidably mounted to the machine extending between both sides of the machine and below the bottom of the machine and an activation element extending upwardly from the foot, the retention activation mechanism being arranged so that lifting the foot above the ground causes the activation element to activate and lowering the machine on the foot when grounded causes the activation element to deactivate.

According to a further example embodiment there is provided a fork assembly including:
a. one or more forks or tines; and
b. a retention mechanism for locking an agricultural machine to the fork assembly, the fork assembly including a locking element moveable from a first locked position to a second unlocked position.

According to another example embodiment there is provided an agricultural machine having one or more sleeves for receiving one or more tines or forks of a fork assembly and a retention mechanism, wherein the retention mechanism includes a foot extending below the bottom of the machine wherein lifting the foot above the ground activates the retention mechanism to retain the one or more tines or forks and lowering the machine on the foot when grounded releases the retention mechanism.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
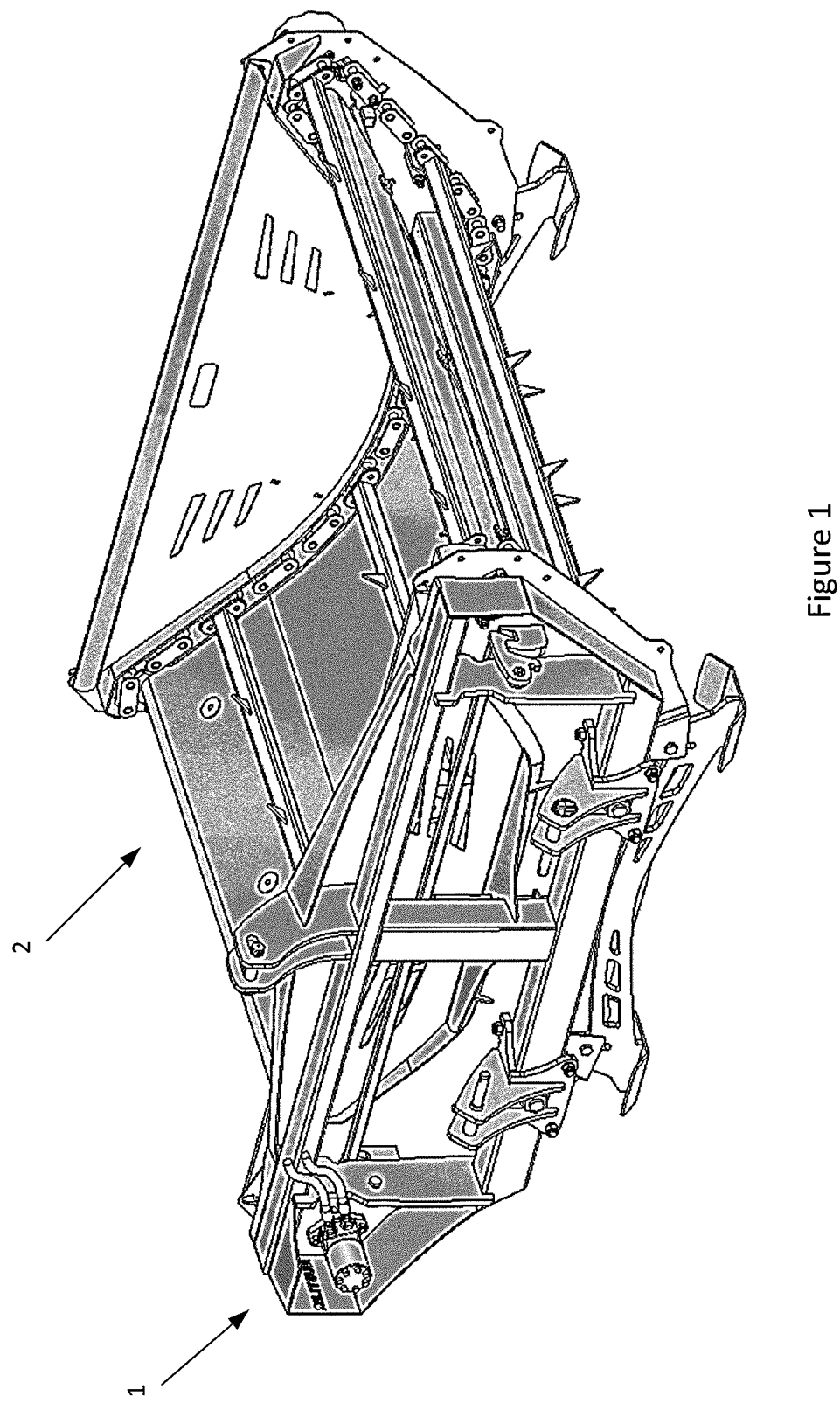
FIG. 1 shows a fork assembly connected to a bale feeder.
Figure 2:
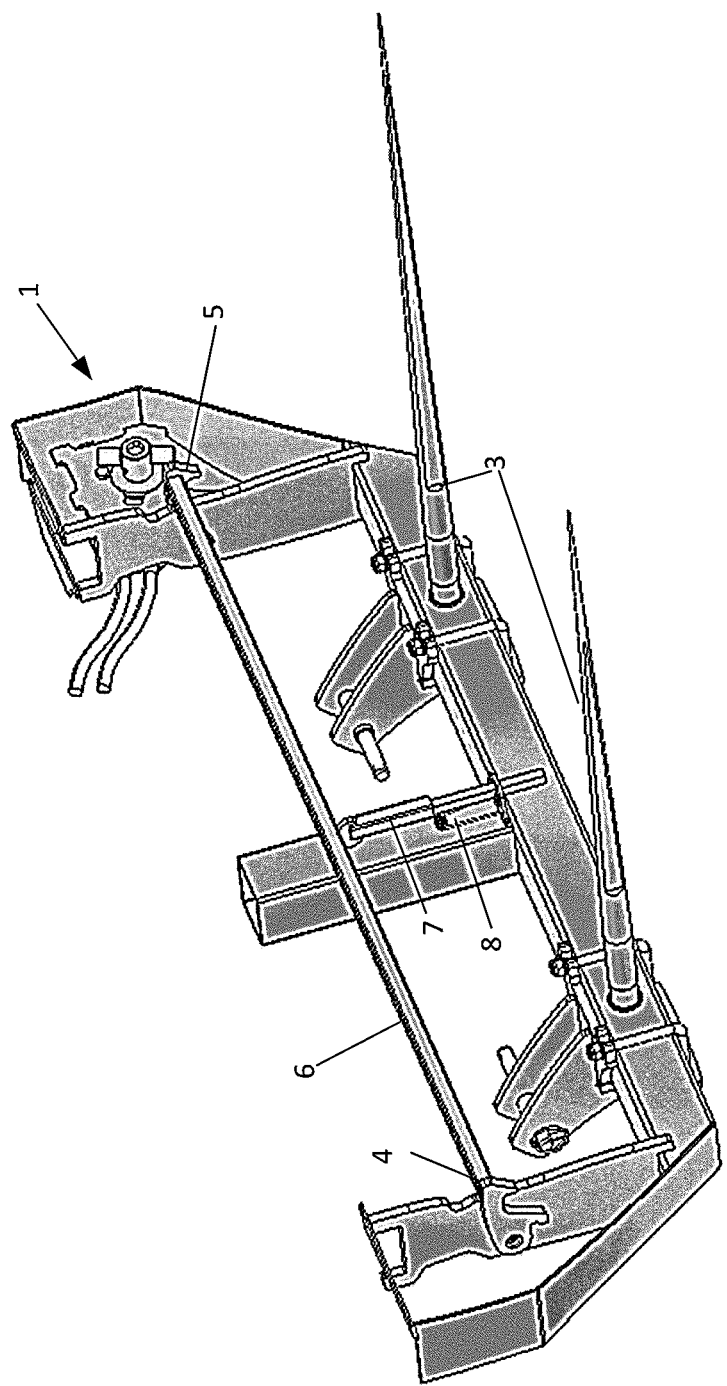
FIG. 2 shows a front perspective view of the fork assembly shown in FIG. 1.
Figure 3:
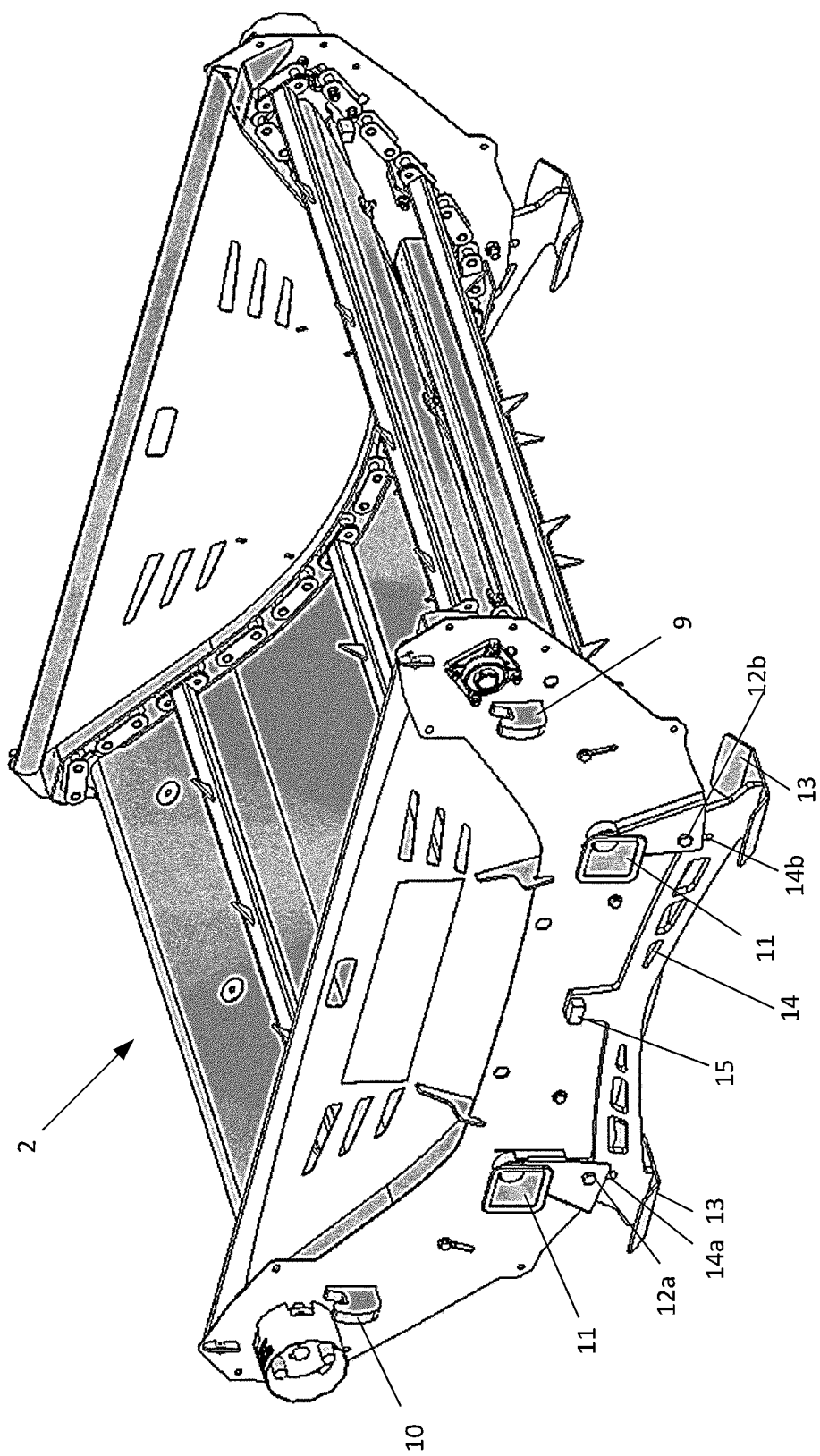
FIG. 3 shows a front perspective view of the bale feeder shown in FIG. 1.

FIGS. 1 to 3 show a fork assembly 1 connected to an agricultural machine in the form of a bale feeder 2 according to a first exemplary embodiment. In this case the fork assembly 1 includes a pair of tines 3, although one or more tines may be employed and forks or the like may be substituted for tines. The terms "forks" and "tines" are intended to cover any element extending from a fork assembly that may be used to lift an agricultural machine such as pins etc. The tines 3 are received by sleeves 11 of the bale feeder as shown in FIG. 3.

When the tines are fully engaged, pivotally mounted latches 4 and 5 engage with fixed hooks 9 and 10. In this position an activation element in the form of rod 7 abuts block 15 of foot 14 and is biased towards block 15 by spring 8. In this way the fork assembly is firmly latched to the bale feeder prior to lifting.

Bolts 12a and 12b pass through slots 14a and 14b so that foot 14 is slidably mounted to the bale feeder. Once the fork assembly lifts the bale feeder off the ground foot 14 may drop to the position shown in FIG. 3 so that block 15 is lowered and spring 8 pushes rod 7 on top of block 15. When the bale feeder is again lowered to the ground foot 15 moves upwardly with respect to the bale feeder body causing block 15 to move up, forcing rod 7 up which, via rod 5, raises latches 4 and 5 so that the fork assembly is unlatched from the bale feeder and may be disengaged.

This arrangement has the advantage that the latches engage whilst the bale feeder is on the ground so that it may be maneuvered before it is lifted and the latches automatically disengage when the bale feed is lowered to the ground. By providing feet 13 on either side of the bale feeder acting on a central point the mechanism works effectively on uneven ground too (i.e. a latch activated by a foot on one side may not be deactivated when the foot cannot be lowered due to uneven ground).

Figure 4:
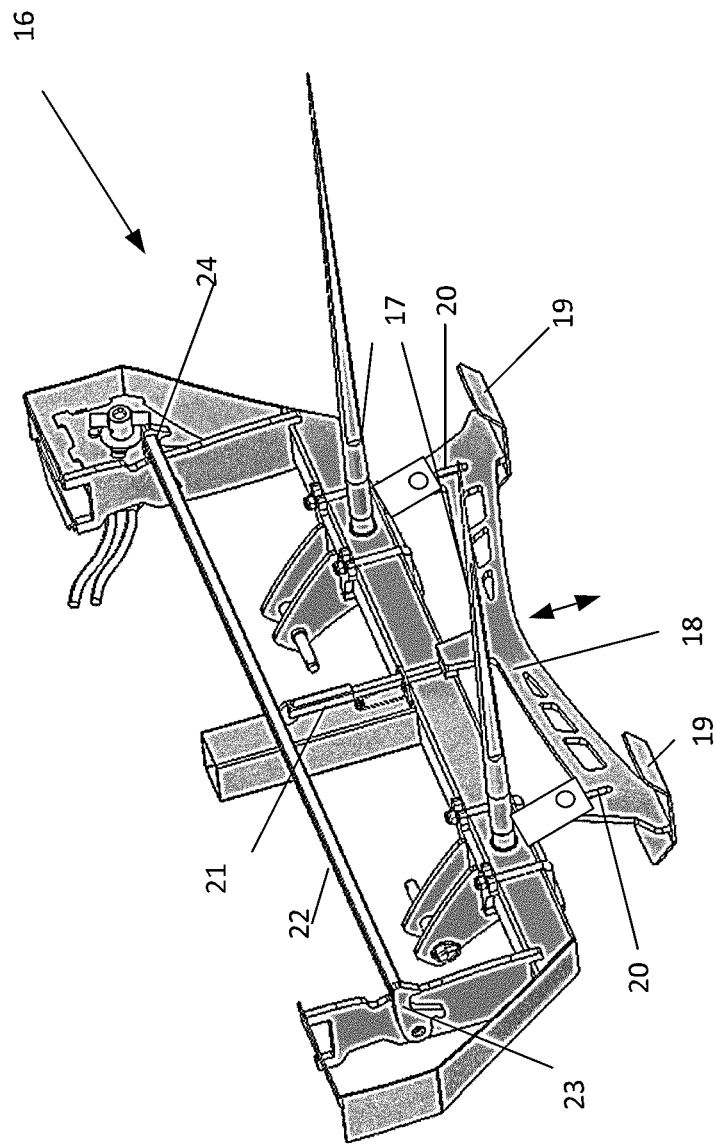
FIG. 4 shows a front perspective view of a fork assembly according to a second embodiment.
Figure 5:
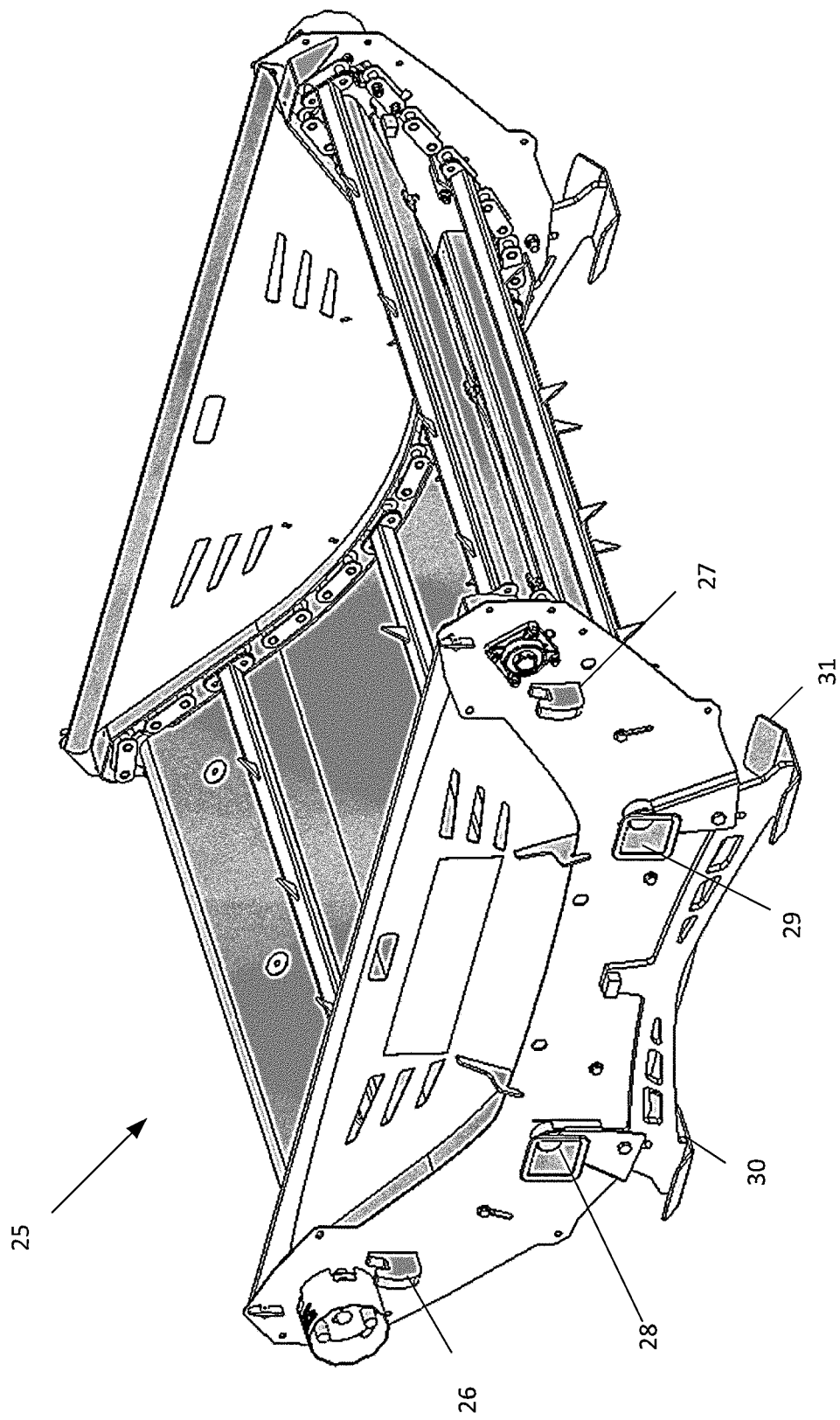
FIG. 5 shows a front perspective view of a bale feeder according to a second embodiment.

Referring now to FIGS. 4 and 5 a second embodiment will be described in which the mechanism is provided entirely on the fork assembly. The fork assembly 16 includes a pair of tines 17 and a moveable foot 18. The bale feeder 25 shown in FIG. 5 has sleeves 28 and 29 to receive the tines and fixed feet 30 and 31. The moveable foot 18 has skids 19 with upturned ends to assist movement when the fork assembly is lowered. The moveable foot 18 has slots 20 to allow the foot to move up and down as in the previous embodiment.

Foot 18 is linked by rod 21 to bar 22 which raises and lowers pivotally mounted latches 23 and 24. When the fork assembly is lowered foot 18 is raised with respect to the fork assembly 16 and so latches 23 and 24 are in the raised disengaged position and when the fork assembly is lifted the foot and latches 23 and 24 are lowered and engage fixed hooks 26 and 27 to retain the bale feeder to the fork assembly.

This configuration has the advantage that the mechanism need only be fitted to the fork assembly with only fixed hooks required on the item of agricultural machinery.

Figure 6:
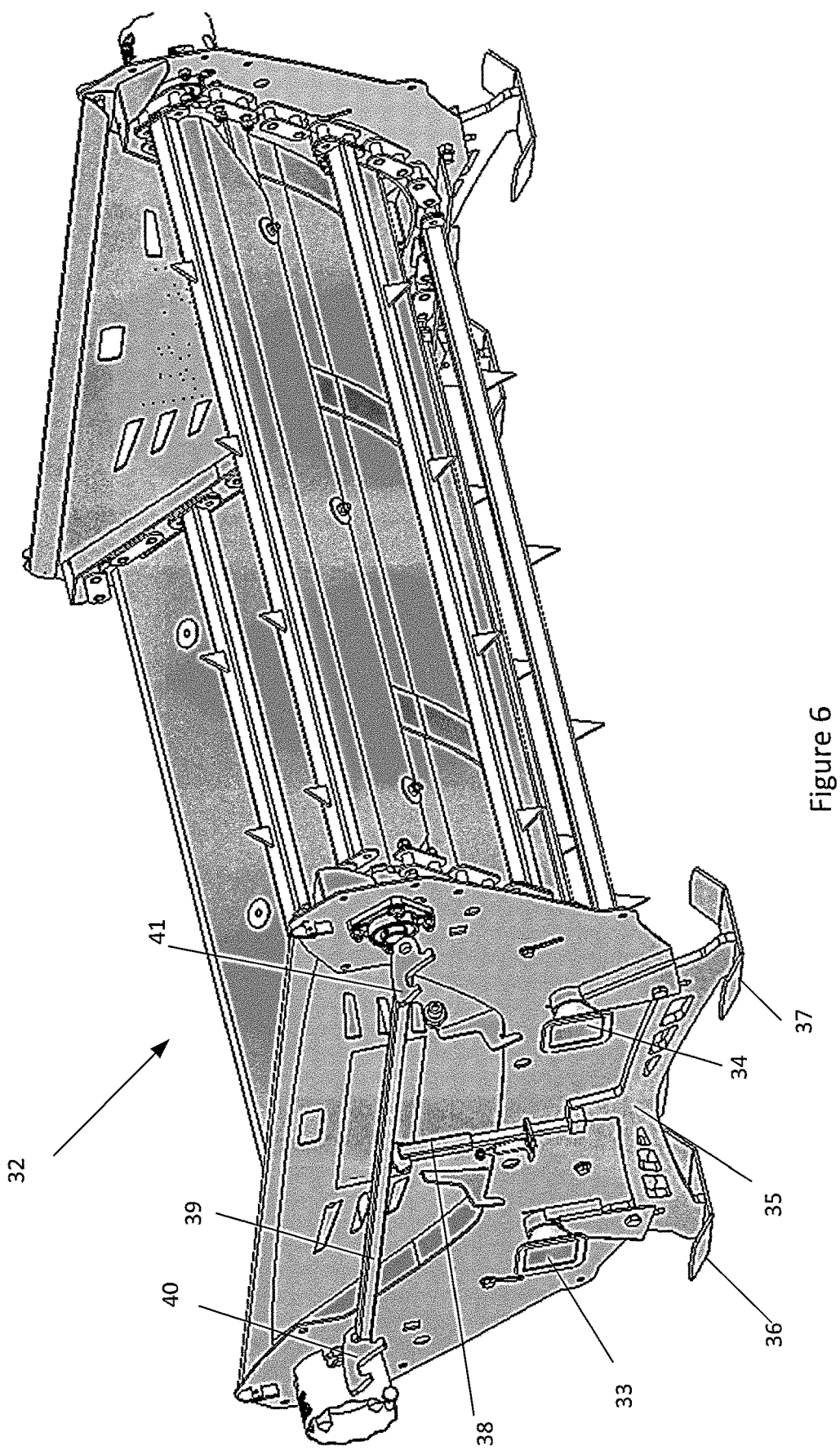
FIG. 6 shows a front perspective view of a bale feeder according to a third embodiment.
Figure 7:
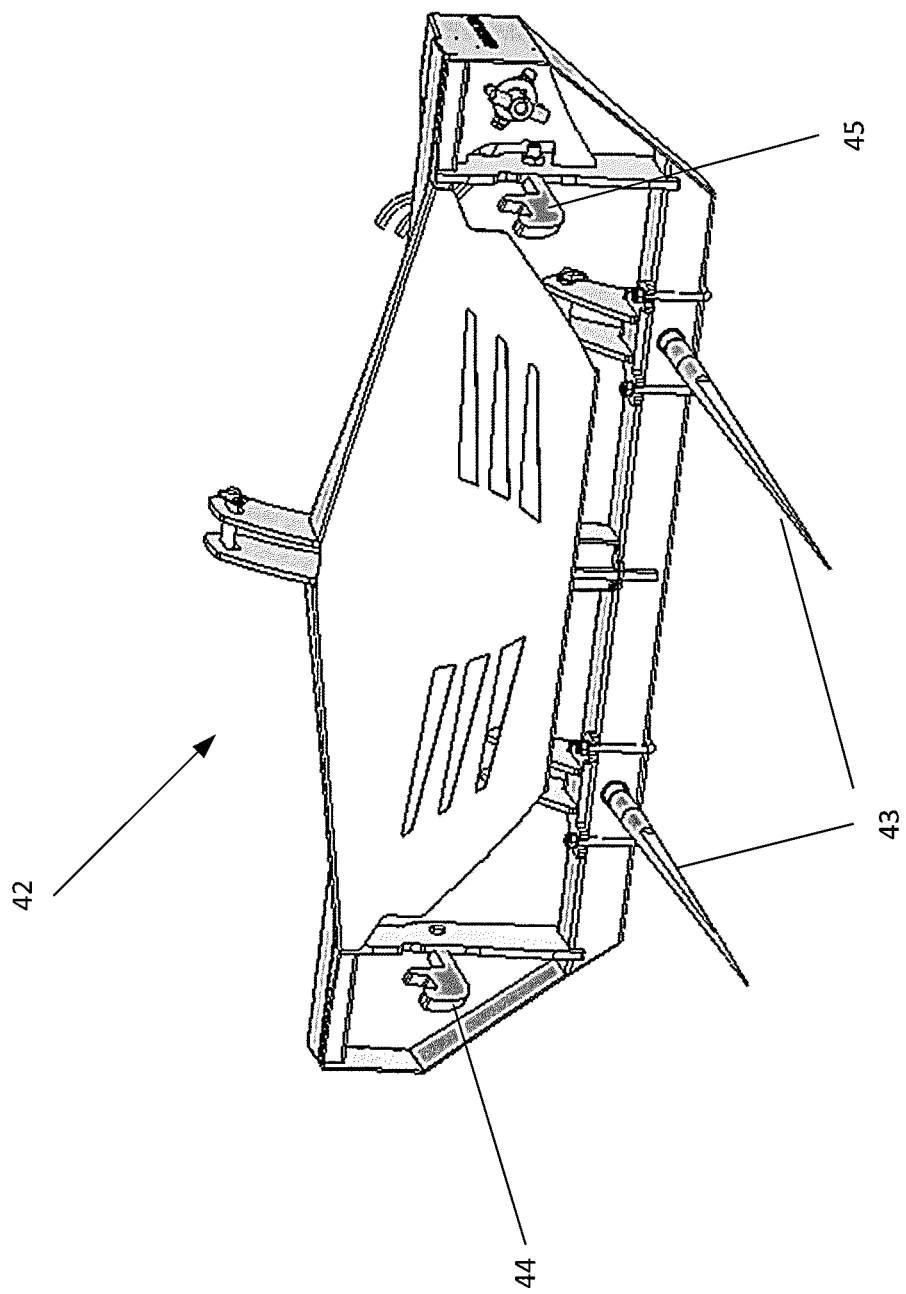
FIG. 7 shows a front perspective view of a fork assembly according to a third embodiment.

Referring now to FIGS. 6 and 7 a third embodiment is shown in which the mechanism is fitted only to the bale feeder. As in the first embodiment foot 35 is moveably mounted to the body of the bale feeder and includes sleeves 33 and 34 for receiving tines 43. Foot 35 includes skids 36 and 37 on either side. Rod 38 is connected to foot 35 and raises and lowers bar 39 as the foot moves up and down to raise and lower pivotally mounted latches 40 and 41.

When the bale feeder 32 is on the ground foot 35 is raised with respect to the bale feeder and causes latches 40 and 41 to be raised. When the fork assembly 42 is engaged and bale feeder 32 is lifted foot 35 lowers with respect to the body of the bale feeder which lowers latches 40 and 41 to secure them with fixed hooks 44 and 45 on fork assembly 42 shown in FIG. 7.

As with the second embodiment this only requires the active mechanism to be provided on one piece of equipment—in this case the bale feeder.

Figure 8:
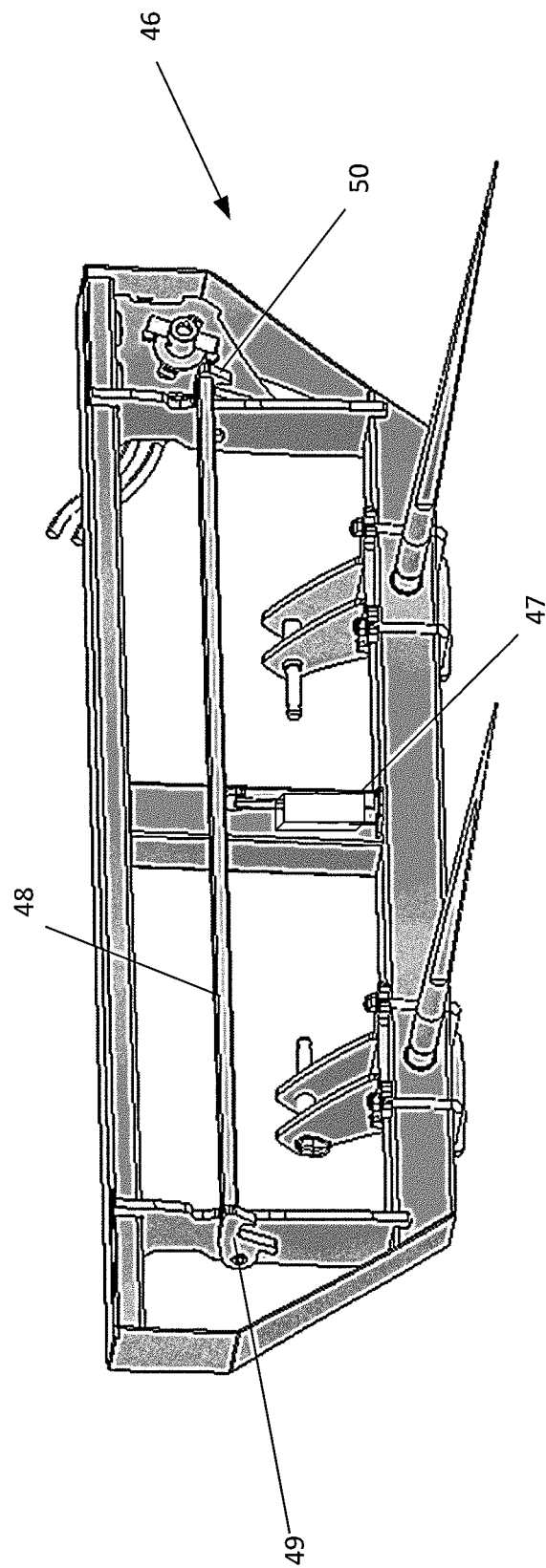
FIG. 8 shows a front perspective view of a fork assembly according to a fourth embodiment.

FIG. 8 shows an alternative arrangement to the second embodiment shown in FIGS. 4 and 5 in which a bar 48 is driven up by a linear actuator 47. In this case the linear actuator is in the form of a solenoid which when energised lifts bar 48 up. The linear actuator could be a suitable hydraulic or electromechanical actuator. The bar 48 is in the lowered position when solenoid 47 is not energised so that the latches 49 and 50 automatically engage with fixed hooks of the bale feeder when a fork assembly engages with a bale feeder (as per the first embodiment). The solenoid may be actuated by a user pushing a button to raise latches 49 and 50 to allow release. Alternatively sensors may determine whether an agricultural machine is raised or lowered and activate linear actuator 47 only when the agricultural machine is lowered after having been lifted. This may be determined via switches detecting when the machine is on the ground, by load sensors detecting the load on the fork assembly etc.

Whilst the retention mechanism has been shown in the form of latches in the above embodiments it will be appreciated that a variety of mechanisms may be employed such as twist lock arrangements, locking pins etc. It will also be appreciated that one or more such mechanism may be employed. In a further variant the retention mechanism may be in the form of a clamp actuated by a foot to clamp upon a tine or fork located within a receiving sleeve in an agricultural machine.

There is thus provided a mechanism which effectively prevents an agricultural machine becoming disengaged from forks or tines when it is lifted. Many embodiments do not require an operator to manually latch or unlatch the equipment when it is attached or released. The mechanism may also be self resetting to allow an agricultural machine to be re-engaged immediately after being disengaged. The mechanism assists in the correct positioning of forks or tines, reducing the chance of damage to equipment or tractor. In many embodiments the latches will connect before lifting the machine off the ground—ensuring the machine is effectively retained before completely lifted off the ground. The mechanism works effectively on uneven ground with skids provided on either side.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An agricultural machine arranged to engage with one or more forks or tines of a fork assembly including a retention mechanism, the retention mechanism including a foot slidably mounted to the machine extending between both sides of the machine and below the bottom of the machine and an activation element extending upwardly from the foot, the retention mechanism being arranged so that lifting the foot above the ground causes the activation element to activate and lowering the machine on the foot when grounded causes the activation element to deactivate.

2. An agricultural machine as claimed in claim 1 wherein the retention mechanism includes one or more latches.

3. An agricultural machine as claimed in claim 2 wherein the one or more latches are hooks.

4. An agricultural machine as claimed in claim 2 wherein the activation element includes a rod extending upwardly between the foot and the one or more latches.

5. An agricultural machine as claimed in claim 4 further comprising a spring for biasing the rod.

6. An agricultural machine as claimed in claim 4 further comprising a block coupled to the foot, wherein the spring biases the rod towards the block.

7. An agricultural machine as claimed in claim 1 wherein the foot extends from one side of the agricultural machine to the other.

8. An agricultural machine as claimed in claim 1 wherein the foot includes one or more skids.

9. An agricultural machine assembly as claimed in claim 8 wherein the one or more skids have upwardly inclined tips.

\* \* \* \* \*